(12) United States Patent
Hung et al.

(10) Patent No.: US 8,289,004 B2
(45) Date of Patent: Oct. 16, 2012

(54) DISCHARGE CIRCUIT CONFIGURED FOR FILTER CAPACITOR OF POWER FACTOR CONNECTOR AND HAVING A CONTROL UNIT AND A DISCHARGE UNIT

(75) Inventors: Lung-Yu Hung, Miao-Li Hsien (TW); Sheng-Hsiang Kung, Miao-Li Hsien (TW); Shih-Chuan Chen, Miao-Li Hsien (TW); Chih-Ming Lai, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 327 days.

(21) Appl. No.: 12/764,924

(22) Filed: Apr. 21, 2010

(65) Prior Publication Data

US 2011/0062919 A1    Mar. 17, 2011

(30) Foreign Application Priority Data

Sep. 17, 2009   (CN) .......................... 2009 1 0307228

(51) Int. Cl.
*H02J 7/00*   (2006.01)
(52) U.S. Cl. ....................................................... 320/166
(58) Field of Classification Search .................... 320/166
See application file for complete search history.

(56) References Cited

U.S. PATENT DOCUMENTS

| | | | |
|---|---|---|---|
| 6,949,885 B2 * | 9/2005 | Hamamoto et al. | 315/200 R |
| 2008/0157747 A1 * | 7/2008 | Achart et al. | 323/325 |
| 2008/0203940 A1 * | 8/2008 | Wu | 315/291 |

* cited by examiner

*Primary Examiner* — Arun Williams
(74) *Attorney, Agent, or Firm* — Altis Law Group, Inc.

(57) ABSTRACT

A discharge circuit includes an OC (Optical Coupler), a capacitor, an NPN-type transistor, and a discharge unit. The discharge circuit is parallel connected to a PFC (power factor corrector) circuit which includes a filter capacitor. The discharge unit has a MOSFET and a discharge resistor. A drain of the MOSFET is connected to a first terminal of the PFC circuit via the discharge resistor, a gate thereof is connected the anode of the capacitor, and a source thereof is connected to ground.

4 Claims, 1 Drawing Sheet

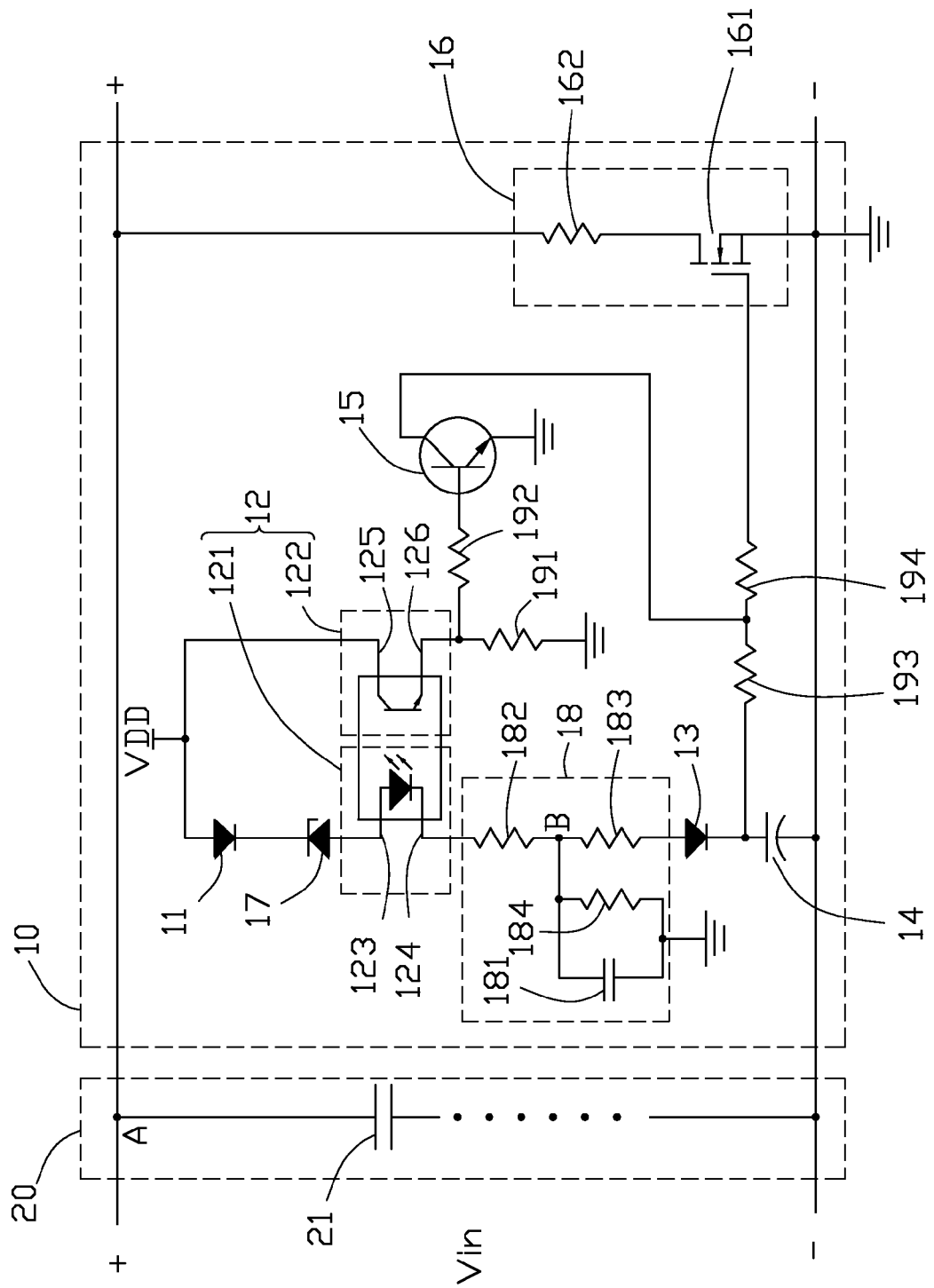

DISCHARGE CIRCUIT CONFIGURED FOR FILTER CAPACITOR OF POWER FACTOR CONNECTOR AND HAVING A CONTROL UNIT AND A DISCHARGE UNIT

BACKGROUND

1. Technical Field

The present disclosure generally relates to a discharge circuit, and particularly to a discharge circuit with a low power consumption and a quick discharge capability.

2. Discussion of Related Art

Generally, a driving module includes a power factor corrector (PFC) circuit. The PFC circuit is used to change wave and phase angle of input current, and then filter high harmonics of the input current by a filter capacitor. Size of the filter capacitor is in a direct ratio to rated power of a load in connection with the driving module. The load can be an LED lamp.

When the driving module is supplied with an external power, the driving module modulates the external power so that it can be used to drive the load, for example, an LED lamp. The filter capacitor of the driving module can filter the high harmonics and store electric energy therein. When the power is turned off, the electric energy stored in the filter capacitor needs to be discharged. Generally, a resistor is used for the electric discharge of the filter capacitor. However, it needs a long time to discharge the electric energy by the resistor, whereby an electrical shock may be occurred to a user when he (she) carelessly electrically touches the driving module.

Therefore, what is needed is a discharge circuit to overcome the above described shortcomings

BRIEF DESCRIPTION OF THE DRAWINGS

The only drawing is a circuit diagram of an exemplary embodiment of a discharge circuit in accordance with the present disclosure.

DETAILED DESCRIPTION OF EMBODIMENTS

Referring to the only drawing, an exemplary embodiment of a discharge circuit 10 is in parallel connection between a PFC (Power Factor Corrector) circuit 20 and a load (not shown). The load in accordance with the present disclosure is an LED lamp. A first terminal A of the PFC circuit 20 is electrically connected to an external power (not shown). The PFC circuit 20 includes a filter capacitor 21 configured for filtering high harmonics of a current from the external power. A second terminal of the PFC circuit 20 opposite the first terminal A is connected to ground. The discharge circuit 10 includes a first diode 11, an OC (Optical Coupler) 12, a second diode 13, a capacitor 14, an NPN-type transistor 15, and a discharge unit 16.

An anode of the first diode 11 is electrically connected to a voltage VDD. In the present embodiment, the voltage VDD is an auxiliary voltage outputted by the PFC circuit 20, and is about 15 volt (V). When the PFC circuit 20 is off, the voltage VDD is zero.

The OC 12 includes a transmitter 121 and a receiver 122. An input terminal 123 of the transmitter 121 is electrically connected to a cathode of the first diode 11 via a Zener diode 17. An anode of the Zener diode 17 is electrically connected to the input terminal 123 of the transmitter 121. The Zener diode 17 is provided for making sure that an input voltage of the transmitter 121 is a constant. In the present embodiment, an output terminal 124 of the transmitter 121 is electrically connected to an anode of the second diode 13 via a voltage dividing circuit 18. A cathode of the second diode 13 is electrically connected to an anode of the capacitor 14, and a cathode of the capacitor 14 is connected to ground.

In the present embodiment, the voltage dividing circuit 18 includes a first resistor 182, a second resistor 183, a second capacitor 181, and a third resistor 184. The first resistor 182 is connected in series to a third terminal B of the second resistor 183, and two terminals of the series-connected circuit formed by the first and second resistors 182, 183 are electrically connected between an output terminal of the transmitter 121 and the anode of the second diode 13. The third resistor 184 is connected in parallel to the second capacitor 181, and two terminals of the parallel-connected circuit formed by the third resistor 184 and the second capacitor 181 are connected to the third terminal B and ground, respectively.

An input terminal 125 of the receiver 122 is electrically connected to the voltage VDD, and an output terminal 126 thereof is electrically connected to ground via a fourth resistor 191.

A base of the NPN-type transistor 151 is electrically connected to the output terminal 126 of the receiver 122 via a fifth resistor 192. An emitter thereof is connected to ground. A collector thereof is electrically connected to the anode of the capacitor 14 via a sixth resistor 193.

The discharge circuit 16 includes a MOSFET 161 and a discharge resistor 162. A gate of the MOSFET 161 is electrically connected to the collector of the NPN-type transistor 15 via a seventh resistor 194. A source of the MOSFET 161 is connected to ground. A drain of the MOSFET 161 is electrically connected to the first terminal A via the discharge resistor 162.

When the PFC circuit 20 is in operation by supplying the external power thereto, the filter capacitor 21 filters high harmonics and stores electric energy therein. The voltage VDD is about 15V; therefore, the OC 12 turns on. As a result, the capacitor 14 stores electric energy therein, and the voltage of the base of the NPN-type transistor 15 approaches VDD; therefore, the NPN-type transistor 15 turns on. As a result, the voltage of the collector of the NPN-type transistor 15 approaches zero. The MOSFET 161 turns off, in condition that the voltage of the gate thereof is equal to that of the source thereof. Thus, the discharge circuit 16 consumes a low power. On the other hand, when the external power turns off, the NPN-type transistor 15 turns off. Therefore, the electrical energy stored in the filter capacitor 21 is discharged via the discharge resistor 162. The size of discharge resistor 162 is in an inverse ratio to the rate of the discharge of the electrical energy in the capacitor 21. Also, the electrical energy stored in the capacitor 14 can be discharged via the discharge resistor 162.

It is to be further understood that even though numerous characteristics and advantages have been set forth in the foregoing description of embodiments, together with details of the structures and functions of the embodiments, the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. A discharge circuit parallel connected to a PFC (power factor corrector) circuit which comprises a filter capacitor, comprising:

an OC (Optical Coupler) comprising a transmitter and a receiver, wherein an input terminal of the transmitter is connected to a voltage VDD via a first diode, and an input terminal of the receiver is connected to the voltage VDD;

a capacitor having an anode connected to an output terminal of the transmitter via a second diode, and a cathode connected to ground;

an NPN-type transistor having a base connected to an output terminal of the receiver, an emitter connected to ground, and a collector connected to the anode of the capacitor; and a discharge unit comprising a MOSFET and a discharge resistor, a drain of the MOSFET being connected to a first terminal of the PFC circuit via the discharge resistor, a gate of the MOSFET being connected the anode of the capacitor, a source of the MOSFET being connected to ground; and a voltage dividing circuit, two terminals of the voltage dividing circuit are electrically connected to the output terminal of the transmitter of the OC and the anode of the capacitor, respectively;

wherein the voltage dividing circuit comprises a first, second, third resistors, the first resistor and the second resistor being connected in series between the output terminal of the transmitter of the OC and the anode of the capacitor, a first terminal of the third resistor being connected to a connected point of the first resistor and the second resistor, and a second terminal of the third resistor being connected to ground.

2. The discharge circuit of claim 1, further comprising a fourth resistor, wherein the output terminal of the receiver is connected to ground via the fourth resistor.

3. The discharge circuit of claim 1, further comprising a fifth resistor, wherein the base of the NPN-type transistor is connected to the output terminal of the receiver via the fifth resistor.

4. A discharge circuit parallel connected to a PFC (power factor corrector) circuit which comprises a filter capacitor, comprising:

a control unit;

a discharge unit comprising a MOSFET and a discharge resistor, wherein a drain is connected to a first terminal of the PFC circuit via the discharge resistor, a gate thereof being connected the control unit, and a source thereof being connected to ground, wherein the control unit comprises an OC (Optical Coupler), a capacitor, an NPN-type transistor, a first diode, and a second diode, wherein the OC has a transmitter and a receiver, an input terminal of the transmitter being connected to a voltage VDD via the first diode, and an input terminal of the receiver being connected to the voltage VDD, an anode of the capacitor being connected to an output terminal of the transmitter via the second diode, a cathode of the capacitor being connected ground; a base of the NPN-type transistor being connected to an output terminal of the receiver, an emitter of the NPN-type transistor being connected to ground, a collector of the NPN-type transistor being connected to the anode of the capacitor; the gate of the MOSFET being connected the anode of the capacitor; and a voltage dividing circuit, wherein two terminals of the voltage dividing circuit are electrically connected to the output terminal of the transmitter of the OC and the anode of the capacitor, respectively;

wherein when the PFC circuit turns on, the MOSFET turns off by the control unit, and on the other hand, when the PFC circuit turns off, the MOSFET turns on by the control unit and electric energy in the filter capacitor of the PFC circuit is discharged by the discharge resistor, and wherein the voltage dividing circuit comprises a first, second, third resistors, the first resistor and the second resistor being connected in series between the output terminal of the transmitter of the OC and the anode of the capacitor, a first terminal of the third resistor being connected to a connected point of the first resistor and the second resistor, and a second terminal of the third resistor being connected to ground.

* * * * *